A. TAYLOR & P. W. GRAY.
MARINE RANGE FINDER.
APPLICATION FILED MAY 23, 1914.

1,257,765.

Patented Feb. 26, 1918.
2 SHEETS—SHEET 1.

Witnesses
Grace P. Brereton
M. E. Shook

Inventors
Alfred Taylor
Percy W. Gray
By Sturtevant & Mason
Attorneys

A. TAYLOR & P. W. GRAY.
MARINE RANGE FINDER.
APPLICATION FILED MAY 23, 1914.

1,257,765.

Patented Feb. 26, 1918.

Witnesses
Grace P. Brereton
M. E. Shook

Inventors
Alfred Taylor
Percy W. Gray
By Sturtevant & Mason
Attorneys

UNITED STATES PATENT OFFICE.

ALFRED TAYLOR AND PERCY WILLIS GRAY, OF YORK, ENGLAND.

MARINE RANGE-FINDER.

1,257,765.   Specification of Letters Patent.   Patented Feb. 26, 1918.

Application filed May 23, 1914. Serial No. 840,512.

*To all whom it may concern:*

Be it known that we, ALFRED TAYLOR and PERCY WILLIS GRAY, both of York, in the county of York, in the Kingdom of England, have invented certain new and useful Improvements in Marine Range-Finders, of which the following is a specification.

The present invention relates to improvements in range finders and like instruments, particularly to that form of instrument in which the height of the observed object is considered as the perpendicular side of a triangle the length of the base of which it is desired to measure, which length, of course, corresponds to the range.

Such range finders have especial utility on vessels, in which case the object sighted, the height of which is observed, may be another ship's mast, funnel or like part.

It is usual to determine ranges by means of an instrument of the sextant type to measure the angle subtended between the line of sight of the top of the object and the line of sight of the bottom of the object. This value of the known height of the object is then used in finding a range by the following calculation—

Log: of the height—log: tan: of the observed angle=log: of the range.

This calculation, however, takes time and there is the liability of error in the making of the same.

According to the present invention it is possible to directly determine ranges by means of an instrument consisting essentially in the combination of a log-arithmic scale, one member of which is displaced proportionally to the displacement of a movable prism combined with a telescope or like instrument.

In certain forms of the present invention the logarithmic scales corresponding to the variables of the problem can be combined directly upon the sighting instrument. In other cases it may be desirable to arrange that the displacement of the moving prism actuates a counter the displaced value of which could be read off with the object of being set upon a separate logarithmic scale or slide rule.

In one form of the present invention the telescope is combined with a movable prism or prisms, the movable member of which may be displaced by the turning of a cam upon which is directly mounted a logarithmic scale, or could be connected thereto by any desired suitable transferring gear. One form of construction according to the present invention is shown in the accompanying drawings, in which:—

Fig. 2 is a top plan view corresponding to Fig. 1: while

Figure 1:
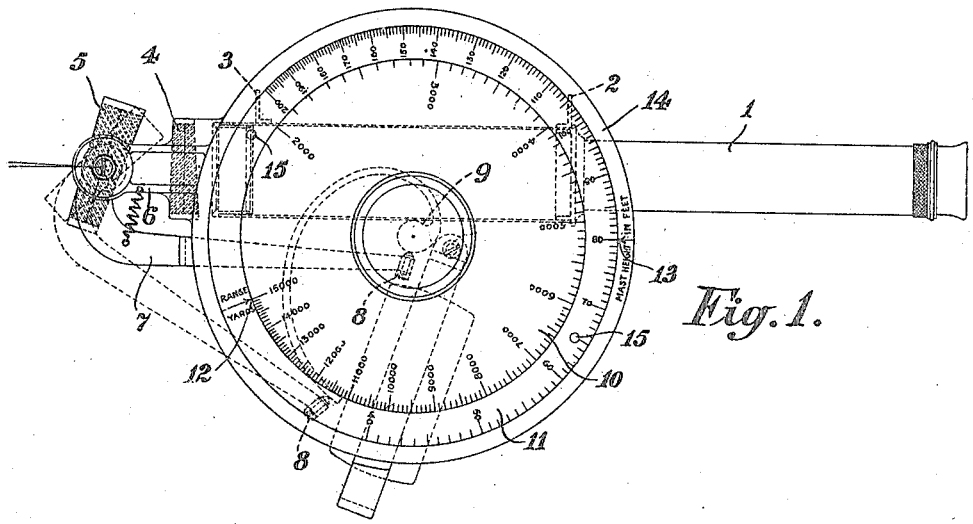
Figure 1 is a side elevation.

The instrument consists of the telescope 1 provided with sights 2 and 3 of usual type. A fixed prism 4 is arranged at one end of the telescope 1. This prism covers half the field of the telescope and is preferably provided with means whereby its position may be adjusted relatively to the telescope and to the other prism. A further prism 5 is provided, arranged to be movable relatively to the telescope. The prisms 4 and 5 may be either simple or achromatic and can, of course, either be arranged in front of the object glass as shown, behind the same or alongside it. A bracket 6 is arranged to carry the prism 5 pivoted thereon and an arm 7 is connected to said prism by which it can be displaced relatively to the other prism or to the telescope 1. The end of the arm 7 carries a pin, knife edge or roller 8 adapted to engage with a cam 9 rotatable by hand about an axis. The pin or roller 8 may be held against the cam by means of a spring. A circular dial 10 is preferably mounted directly upon the cam 9. This dial is provided with a logarithmic range scale. Reading on to this range scale is a pointer or index 12 on an annulus 11 concentric with the scale 10 which can be turned around into any position, for instance, by means of small handles 15, and has upon it a logarithmic scale of heights of objects sighted such as the mast of a vessel, which heights will be subsequently termed mast heights. The scale upon the annulus 11 coöperates with a fixed index 13 on the frame 14 inclosing the scales. It will thereby be seen that the displacement of the prism directly sets one scale while a second annular scale can be set to the mast height, whereupon the range can be read directly off from the index on the annular scale.

The cam 9 is of such contour that the scale 10 connected to it is rotated through a distance corresponding to the log-tan of the angle subtended by the object viewed corresponding to the displacement of the prism by the cam.

In use the horizon or base of the object under view is sighted through the clear half of the telescope 1 and then the cam 9 is turned by hand displacing the prism 5 about its pivot on the bracket 6 until the top of the mast height is visible through the other side of the telescope. The scale 11 will be then set to the known mast height under observation whence the range can be read directly from the pointer 12. It is obvious that the instrument may be used in the inverse manner, that is to say, if the range be known beforehand and the index 12 on the annulus be brought opposite to it on the range scale 10 connected to the cam 9, the height of the object will be indicated by the index 13.

Figure 2:
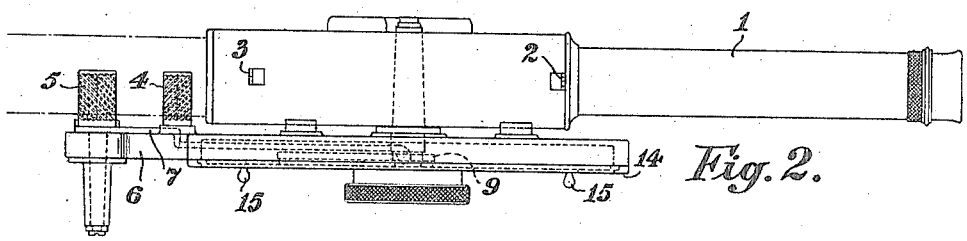
Figure 3:
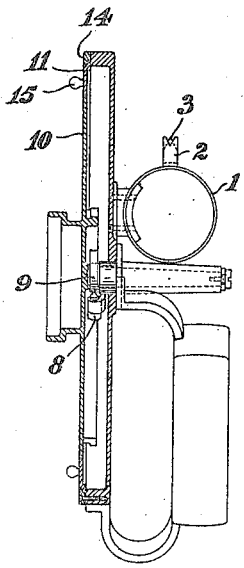
Fig. 3 is an end view partly in section.

In the construction illustrated in Figs. 1 and 2 the pair of prisms are arranged with their bases substantially opposite, so that the deviation of the line of sight caused by the second or fixed prism when set at zero is corrected, consequently an object viewed through the unobstructed half of the object glass then appears in the same line of sight as through the prisms.

Figure 4:
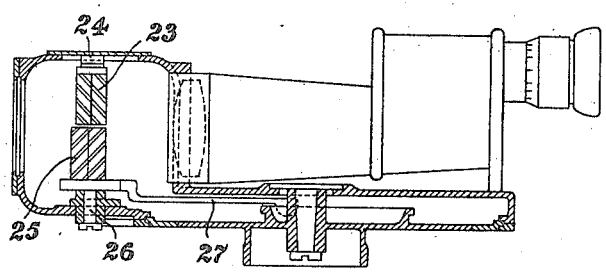
Fig. 4 is a sectional plan view of a modified construction.
Figure 5:
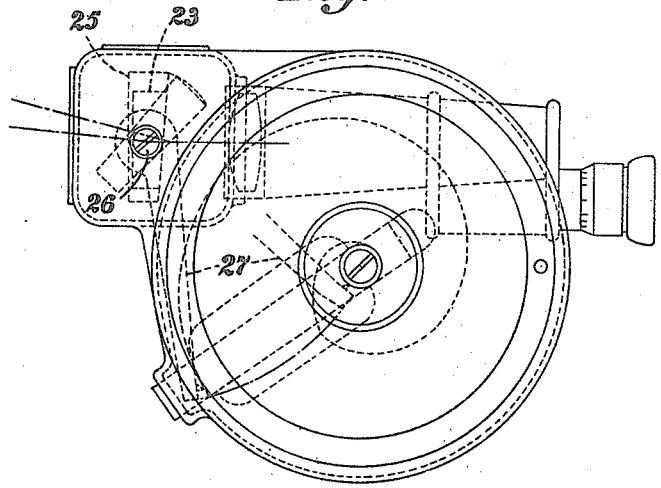
Fig. 5 is a side elevation corresponding to Fig. 4.

In the modified construction shown in Figs. 4 and 5 it will be seen that one half field of the telescope is covered by a fixed prism while the other half is covered by the movable prism. By this latter arrangement, the deviation caused by the moving prism remains uncorrected and the other or fixed prism alongside causes a similar amount of deviation when at the zero position. In this construction the fixed prism such as 23, is pivoted on a frame 24 by which its position can be adjusted for zero setting and it then normally remains stationary. The prisms 25, on the other hand, however, forms the movable prism movable about a pivot 26 and carries the finger or roller 27 bearing on the cam face on the circular scale as previously described. In use the base of the mast or like object under observation, the range of which is to be determined, is sighted through the right-hand field covered by the prism 23 and the mast top is sighted through the prism 25, and this latter prism is, of course, turned until the mast top is brought into line with the base of the mast viewed through the prism 23. It will be seen that by arranging these two prisms in line across the object glass and with their inner edges adjoining, each viewed image will suffer deviation to about the same extent.

The divisions on the scales are preferably such that given any mast height range the tilt or displacement of the prism will be the same for any multiple of that mast height range. Thus, if the instrument be set for say 40 feet mast height and reads 3,000 yards range, it may be used with the same range setting for an 80 foot mast height and will then read 6,000 yards range.

One method of dividing the scales is as follows:—In the case of an instrument with a divided head the instrument is set to give no deviation of the line of sight and the divided head is graduated up to say 1000 for that position. The head is then turned to another division and the angle of deviation of the line of sight which follows is carefully measured on an accurate circular dividing machine or on a scale set up some distance away. The angular deviation is thus found for every division on the drum head, and if the logarithmic tangent of each angle of deviation be multiplied by a constant (which may be any number that will give a conveniently open scale) positions are obtained for a set of divisions which are to represent the angular deviation. The divisions on the movable height scale are found by multiplying the logarithm of each height by the same multiple as is used for the degree scale and similarly the range scale. In this way we have a slide rule of the necessary form viz.:—log: of the height —log: tan. of observed angle=log: of range.

The optical part of the instrument may be either monocular or binocular, and the fixed prism placed either behind or in front of the moving prism, or it may be out of line with it, and covering the other half of the object-glass.

These differences do not affect the principle of the present invention which can be carried out by means of a great number of various constructions, all within the scope thereof.

The instrument of the present invention may, of course, be in the form of a hand instrument or may be mounted upon a fixed base.

Any desired means can, of course, be added for locking the scale carrying the cam in a set position.

We declare that what we claim is:—

1. A range finder including in combination, a sighting instrument having a fixed sighting element and a shiftable light-deflecting sighting element, whereby two lines of sight may be used to find the variable angle of a measuring triangle, a shiftable logarithmic slide having one part for indicating the remote bases and another part for indicating ranges, and means connecting the shiftable slide with said shiftable sighting element, whereby the logarithmic slide is moved through a distance corresponding to the logarithmic tangent of the angle subtended by the object viewed.

2. A range-finder including in combination, a sighting instrument having a fixed sighting element and a shiftable light-deflecting sighting element, whereby two lines of sight may be used to find the variable angle of a measuring triangle, a circular dial having a logarithmic range scale thereon, an annulus concentric with said dial, said annulus having a pointer coöperating with the scale on the dial and a logarithmic scale of the remote base, said range finder having a fixed pointer coöperating with said last named logarithmic scale, a cam connected to said dial and operating to move the shiftable light-deflecting sighting element, said cam being shaped so that the same is rotated through a distance corresponding to the logarithmic tangent of the variable angle of the measuring triangle.

In witness whereof we have hereunto signed our names this 12th day of May, 1914, in the presence of two subscribing witnesses.

ALFRED TAYLOR.
PERCY WILLIS GRAY.

Witnesses:
CHARLES E. TAYLOR,
DORA H. GIBSON.

Copies of this patent may be obtained for five cents each, by addressing the "Commissioner of Patents, Washington, D. C."